United States Patent [19]
Ellis et al.

[11] Patent Number: 6,112,278
[45] Date of Patent: *Aug. 29, 2000

[54] METHOD TO STORE INITIATOR INFORMATION FOR SCSI DATA TRANSFER

[75] Inventors: Jackson L. Ellis; Matthew C. Muresan; Graeme M. Weston-Lewis, all of Fort Collins, Colo.

[73] Assignee: LSI Logic Corporation, Milpitas, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/723,110

[22] Filed: Sep. 30, 1996

[51] Int. Cl.[7] .............................. G06F 12/00; G06F 13/38
[52] U.S. Cl. .......................... 711/118; 711/128; 711/129
[58] Field of Search .................................. 711/118, 210, 711/148, 153, 170, 173, 1, 128; 395/309, 824; 707/100, 532; 710/129

[56] References Cited

U.S. PATENT DOCUMENTS

| | | | |
|---|---|---|---|
| 4,812,969 | 3/1989 | Takagi et al. | 711/207 |
| 5,283,872 | 2/1994 | Ohnishi | 395/309 |
| 5,353,430 | 10/1994 | Lautzenheiser | 395/425 |
| 5,367,647 | 11/1994 | Coulson et al. | 395/325 |
| 5,421,014 | 5/1995 | Bucher | 395/650 |
| 5,463,743 | 10/1995 | Galloway | 395/285 |
| 5,524,268 | 6/1996 | Geldman et al. | 395/825 |
| 5,535,116 | 7/1996 | Gupta et al. | 364/134 |
| 5,551,027 | 8/1996 | Choy et al. | 711/173 |
| 5,615,367 | 3/1997 | Bennett et al. | 707/207 |
| 5,634,110 | 5/1997 | Laudon et al. | 711/148 |
| 5,652,839 | 7/1997 | Giorgio et al. | 395/839 |
| 5,717,949 | 2/1998 | Ito | 710/4 |
| 5,721,840 | 2/1998 | Soga | 395/309 |
| 5,805,855 | 9/1998 | Liu | 711/108 |
| 5,809,279 | 9/1998 | Oeda et al. | 711/153 |

FOREIGN PATENT DOCUMENTS

| | | | |
|---|---|---|---|
| 0451516 | 10/1991 | European Pat. Off. | G06F 13/38 |
| 2291317 | 1/1996 | United Kingdom | G06F 13/38 |

OTHER PUBLICATIONS

Spelman, J. "What *is* a relational database?" [Online] news://comp.sys.mac.databases, Feb. 22, 1996.

Codd, E. "A Relational Model of Data for Large Shared Data Banks," Communications of the ACM, vol. 13, No. 6, Jun. 1970, pp. 377–387, Jun. 1970.

Handy, J. The Cache Memory Book. Section 1.5, "Cache Data and Cache–Tag Memories", pp. 14–22, 86. 1993.

*Primary Examiner*—Eddie P. Chan
*Assistant Examiner*—Yamir Encarnacion

[57] ABSTRACT

In a data processing system having few initiators or several initiators with the same parameters, support for all initiators is provided by storing sets of parameters and corresponding lists of initiator IDs in cache entries. Based on the initiator ID in a selection command, the target selects the appropriate parameters and automatically transitions to data transfer mode. Low cost support for all initiators is thus provided.

17 Claims, 4 Drawing Sheets

METHOD TO STORE INITIATOR INFORMATION FOR SCSI DATA TRANSFER

BACKGROUND OF THE INVENTION

1. Technical Field

The present invention relates generally to an improved data processing system and in particular to an improved method and apparatus for implementing a shared bus in a data processing system. Still more particularly, the present invention relates to an improved method and apparatus for accommodating multiple interface configurations to a shared bus in a data processing system.

2. Description of the Related Art

Personal computers are becoming even more powerful, reaching levels where they are displacing minicomputers and even mainframe computers. In the process of downsizing, however, connectivity between and/or among personal computers and peripheral devices has evolved as a critical issue. Thus it has become increasingly important to be able to share peripheral devices such as hard drives, printers, scanners, or CD-ROM changers between multiple personal computers, or to be able to attach several peripherals to a single personal computer.

One means for achieving such connectivity is through use of the small computer system interface ("SCSI" or commonly called the "SCSI bus"). The fiber channel bus architecture and other shared bus architectures may also be used. For the purposes of illustrating the invention, the SCSI bus will be referred to as a convenient example of such shared buses.

The SCSI bus is a popular, device independent parallel bus. Various versions of the SCSI standard have been proposed, approved, and/or adopted, including SCSI-1, SCSI-2, and SCSI-3. As used herein, the acronym "SCSI" is used to refer to any of these standards, although the SCSI-3 standard has been selected as exemplary for the purposes of describing the invention. Specifications for these standards may be obtained from the American National Standards Institute, New York, N.Y., as document numbers X3.131-1986 (SCSI-1), X3.131-1994 (SCSI-2), and X3.253-1995 (approved SCSI-3), which are incorporated by reference.

The SCSI standard provides specifications for mechanical, electrical, and functional characteristics of the bus, including definitions of the physical characteristics of the bus conductors, the electrical characteristics of the signals that the conductors carry, and the meanings of those signals (e.g., control or data).

Devices interconnected by a SCSI bus are daisy-chained together using a common 50-conductor cable. The cable comprises nine data conductors (eight for data and one for parity), nine control conductors, and other power and ground conductors. Optionally, a 68-conductor cable may be used to allow wider information transfers (data only) of 16 bits. Typically each conductor is resistively coupled to a voltage of an inactive state. To "assert" a signal onto a conductor, a device must drive the conductor to a voltage of an active state against the resistive coupling of the conductor. If not driven, a conductor will return to its inactive state.

Communication over the SCSI bus is allowed between only two devices at any given time, although up to sixteen devices may be interconnected by the same bus. When two devices communicate on the bus, one acts as an "initiator" and the other acts as a "target." Initiator devices cause target devices on the bus to perform commands whereas target devices perform commands for the initiators. There can be multiple initiators and multiple targets on a SCSI bus. The initiator originates an operation (i.e., requests an I/O process to be performed) and the target performs the operation. Transfers from storage media on a SCSI bus are typically synchronous (although an asynchronous option is defined) and follow a "handshaking" protocol involving the exchange of a "Request" signal from a target and an "Acknowledge" signal from an initiator. This exchange takes place on conductors of the bus that are specifically dedicated to the handshaking task, and is performed in connection with each individual information transfer operation on the SCSI bus.

At a higher logical level, the SCSI standard defines a protocol for managing data transfers on the bus. The protocol comprises various phases, beginning with the SCSI bus in a "bus free phase" in which the SCSI bus is idle. To initiate a data transfer process, the initiator causes the bus to enter an "arbitration bus phase." During the arbitration bus phase, each initiator arbitrates for the bus with the other initiators by asserting the appropriate SCSI bus conductor corresponding with a SCSI identifier (SCSI ID) unique to that specific initiator. Because each SCSI ID has an assigned priority, the initiator with the highest priority will win control of the bus. After winning control of the bus through arbitration, the initiator with the highest priority selects the target device of interest in a "selection bus phase." The initiator controlling the bus asserts its SCSI ID as well as the SCSI ID of the target onto the conductors of the SCSI bus. The target detects its SCSI ID on the bus conductors and responds. In a subsequent "command bus phase," the target requests a SCSI command from the initiator in control of the bus.

At still a higher logical level, the SCSI standard defines a command and status structure. Commands are used by an initiator to request a target to perform particular operations. Each SCSI command, called a SCSI command descriptor block (CDB), consists of multiple bytes, either six, ten, twelve, or sixteen bytes. The command contains information which includes a SCSI operation code indicating the type of operation to be performed. At the completion of a command, or if for some reason a command cannot be completed by the target, the target sends a status byte to the initiator to inform the initiator of its condition.

The specifications of the SCSI standard thus combine to define an interface having multiple protocol levels. The defined interface provides computer systems with device independence within a class of devices. For example, a variety of mass storage devices (such as disk drives, tape drives, optical drives, and memory caches), printers, microprocessors, and other devices may be added to a computer system without requiring modifications to system hardware or software. In addition, special features and functions of individual devices can be handled through the use of device-dependent fields and codes in the command structure.

Hard disk controller host interfaces for target hard disk drives accessed by multiple initiators may automatically transition to a data transfer after being selected. Targets which do not automatically transition to data transfer after being selected normally program the initiator parameters with the DMA context for each command. This does not allow the hardware to be programmed with the appropriate parameters for a new command until the firmware has handled the command interrupt.

Targets which automatically transition to data transfer after being selected usually have N initiator cache entries. Each entry, dedicated to one initiator, specifies all of the required parameters for that initiator. Thus the hardware can be programmed with the appropriate parameters for a new command if the initiator's information is cached in one of the N entries. The trade-off between the number of initiators supported and the number of cache entries requires either a high cost or limiting support to a small number of initiators. Where more initiators are present than can be supported, additional processing overhead in the controller must be expended to swap out initiator information.

It would be desirable, in a target which transitions automatically to data transfer when selected, to support a maximum number of initiators while minimizing the additional architectural and processing overhead required.

SUMMARY OF THE INVENTION

In a data processing system having few initiators or several initiators with the same parameters, support for all initiators is provided by storing sets of parameters and corresponding lists of initiator IDs in cache entries. Based on the initiator ID in a selection command, the target selects the appropriate parameters and automatically transitions to data transfer. Low cost support for all initiators is provided.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
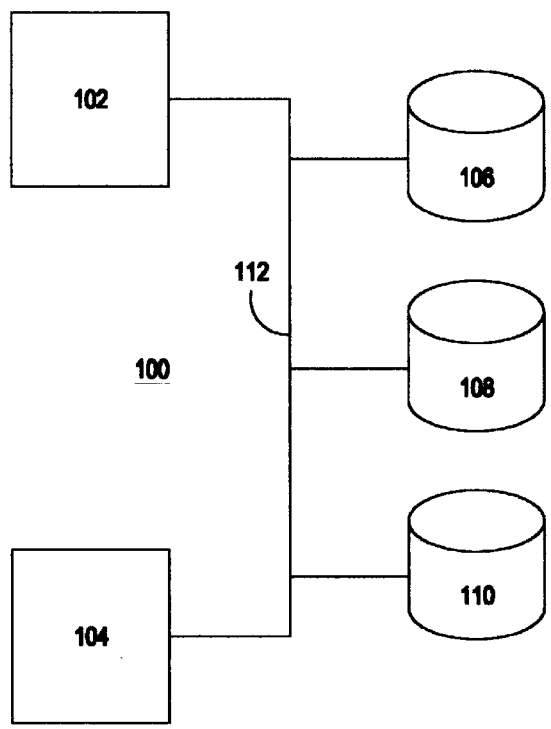
FIG. 1 depicts a data processing system in which a preferred embodiment of the present invention may be implemented.

With reference now to the figures, and in particular with reference to FIG. 1, a data processing system is depicted in which a preferred embodiment of the present invention may be implemented. Data processing system 100 includes computer systems 102 and 104 connected to subsystems 106, 108, and 110. These subsystems are disk drive subsystems in the depicted example. Computer systems 102 and 104 are connected to subsystems 106, 108, and 110 by bus 112. According to the present invention, bus 112 may be implemented using a number of different bus architectures, such as a SCSI bus or a fiber channel bus. As noted above, the SCSI architecture will be used herein for the purposes of illustrating the present invention.

Figure 2:
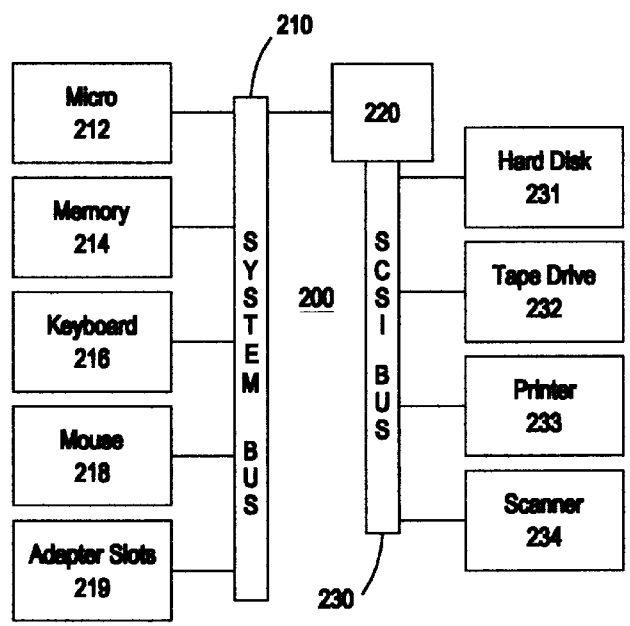
FIG. 2 is a block diagram of an alternative embodiment of a data processing system in which a preferred embodiment of the present invention may be implemented.

Referring to FIG. 2, an alternative embodiment of a data processing system in which a preferred embodiment of the present invention may be implemented is illustrated. Data processing system 200 includes a system bus 210 connecting microprocessor 212, memory 214, keyboard 216, a pointing device such as mouse 218, adapter slots 219, and other system components not shown. Adapter slots 219 may optionally be used to connect data processing system 200 to an external SCSI bus linking multiple computer systems and/or peripherals as depicted in FIG. 1.

Referring back to FIG. 2, also connected to system bus 210 through SCSI adapter 220 is SCSI bus 230. SCSI bus 230 may, in turn, be removably connected to additional peripherals such as hard disk 231, backup tape drive 232, printer 233, scanner 234, and other input/output peripheral devices. Those skilled in the art will recognize that any number of configurations of data processing systems which utilize a shared bus are possible.

Figure 3:
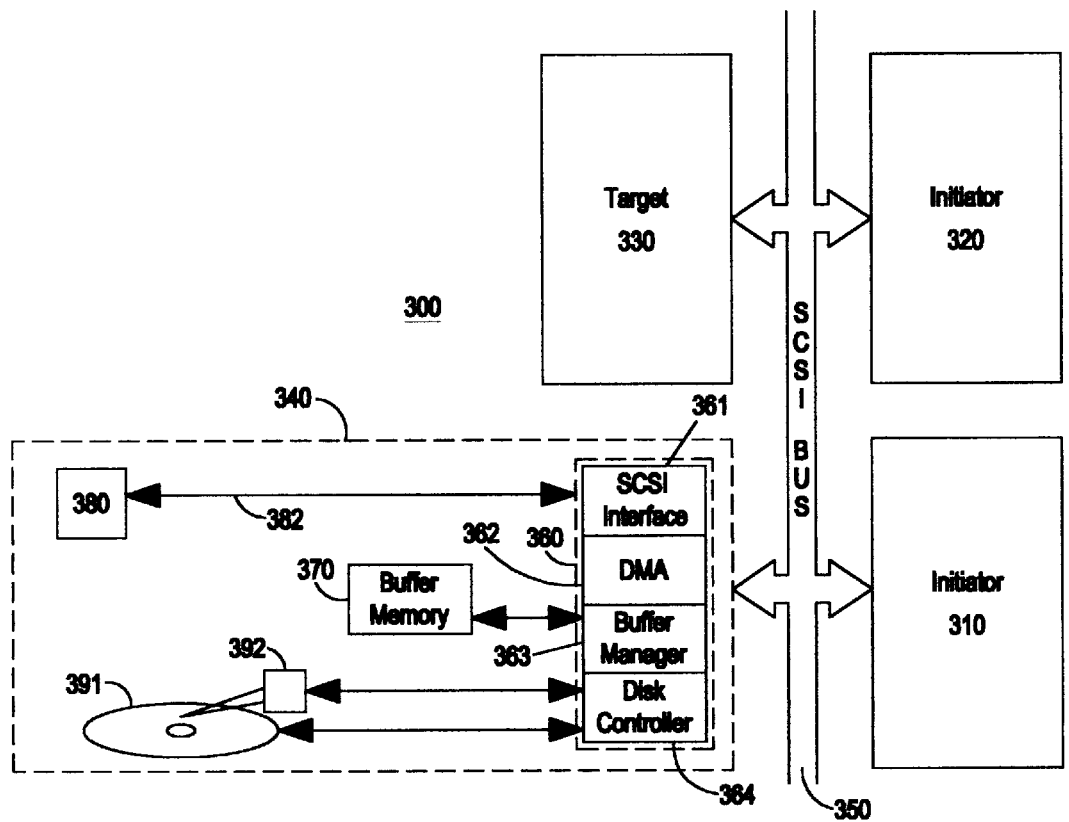
FIG. 3 depicts one possible bus configuration for a data processing system in which a preferred embodiment of the present invention may implemented.

With reference now to FIG. 3, a simplified block diagram showing one possible bus configuration for a data processing system in which a preferred embodiment of the present invention may implemented is depicted. The bus configuration 300, a SCSI bus in the depicted example, includes both initiator devices 310, 320 as well as target device 330, 340 coupled to bus 350. Target device 340 is a hard disk computer peripheral device in the depicted example comprising a controller 360, a buffer memory 370, a microprocessor 380, a hard disk 391, and a hard disk servo 392. Controller 360 includes functional blocks such as bus interface portion 361, DMA engine 362, buffer manager 363, and disk controller 364. These functional blocks, as well as others not shown, may be implemented in a number of different ways depending on the particular application. Controller 360 includes interfaces to buffer memory 370, microprocessor 380, a read/write interface to hard disk 391, and hard disk servo 392. Microprocessor interface 382 is connected to and controls the functional blocks depicted as bus interface 361, DMA engine 362, buffer manager 363, and disk controller 364.

Figure 4:
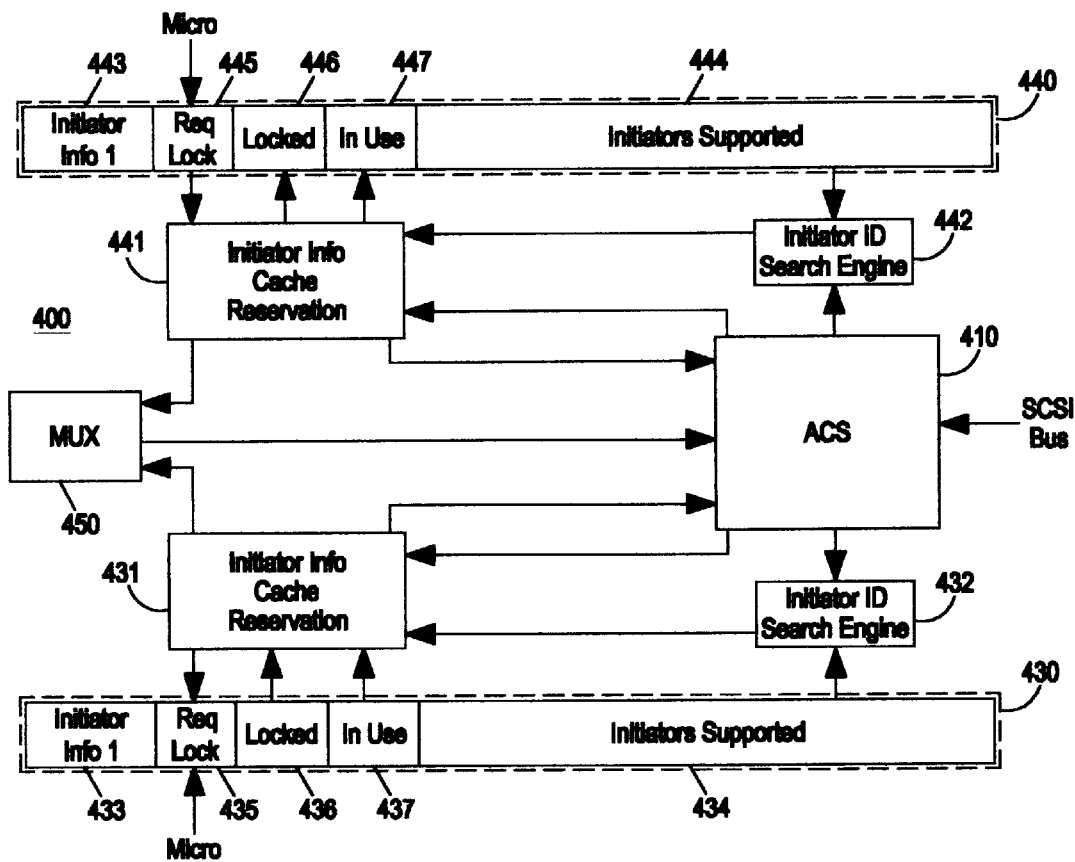
FIG. 4 is a block diagram of a portion of a bus controller in accordance with a preferred embodiment of the present invention.

Referring to FIG. 4, a block diagram of a portion of a bus controller in accordance with a preferred embodiment of the present invention is depicted. The portion of interest 400 includes protocol engine (ACS) 410 connected to the SCSI bus. ACS 410 is a master state machine providing the requisite automated logic for sequencing through the SCSI phases and receiving initiator requests. Cache entries 430 and 440 may be selected by ACS 410 through corresponding cache reservation units 431 and 441. Each cache entry 430, 440 is also connected to its own corresponding search initiator ID search engine 432, 442, which have their own connections to corresponding cache reservation units 431 and 441.

Each cache entry 430, 440 contains a set of initiator parameters 433, 443 such as period, offset, wide/narrow, and speed. In addition to initiator parameters 433, 443, each cache entry 430, 440 also contains a plurality of bits 434, 444 corresponding to the initiators which may be supported by the parameters in that cache entry. These bits identifying the initiators supported 434, 444 are supplied to initiator id search engines 432, 442 to determine whether an initiator ID received off the SCSI bus corresponds to an initiator supported by the parameters 433, 443 in either cache entry 430, 440.

Each cache entry 430, 440 also includes a series of bits for locking the cache entry. A handshake from the microprocessor to each arbiter or reservations unit 431 and 441 is provided through request lock bits 435, 445 and locked bits 436, 446. In-use status bits 437, 447 are also provided to reservation units 431 and 441 from each cache entry 430 and 440. Thus the microprocessor can lock each cache entry 430, 440 to prevent the information contained within from being used while it is being updated, and the search engines 432, 442 can also lock the cache entries 430, 440 to prevent the information from being updated while it is being used.

A particular SCSI bus typically will not include a large number of initiators having different parameters. When multiple initiators are included, they are generally of the same type, as being perhaps an older version supporting the lowest data rate and a newer version supporting a higher data rate. Therefore two sets of parameters will generally be sufficient to support most if not all initiators. Thus, the depicted example shows only two cache entries 430, 440. Those skilled in the art will recognize, however, that more cache entries may be employed.

Each reservation unit 431, 441 is connected to multiplexer 450 and, upon being signaled by search engine 432 or 442, causes multiplexer 450 to select the appropriate initiator parameters 433 or 443 and pass them to ACS 410. Each reservation unit 431, 441 may directly signal ACS 410 when the initiator ID obtained from the SCSI bus matches an ID of the initiators supported 434, 444 by one of cache entries 430 or 440.

Figure 5:
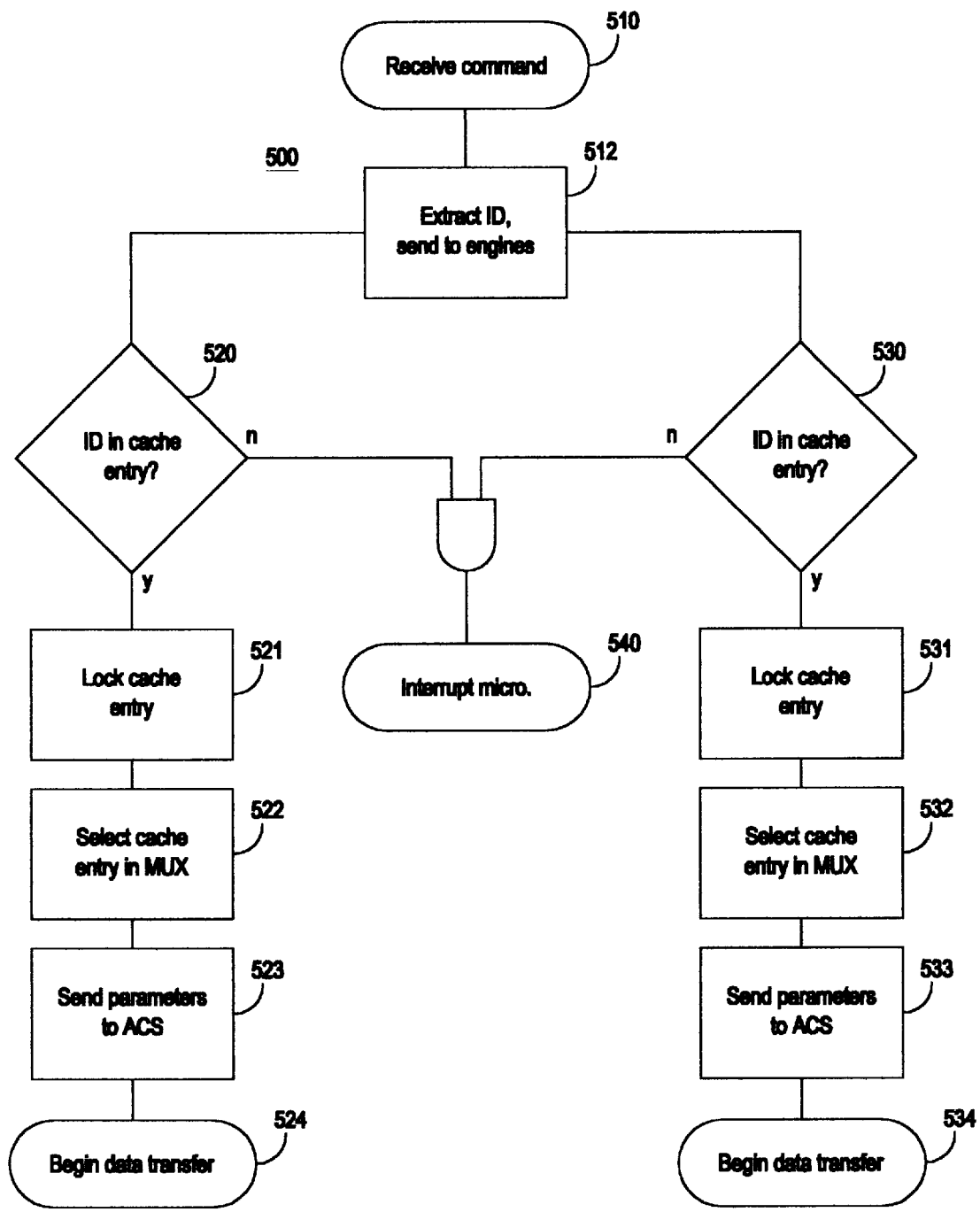
FIG. 5 depicts a high level flowchart for a process by which the appropriate initiator parameters are selected in accordance with a preferred embodiment of the present invention.

With reference now to FIG. 5 a high level flowchart for a process by which the appropriate initiator parameters are selected in accordance with a preferred embodiment of the present invention is illustrated. The process begins when the controller is selected or reselected and receives a command (step 510). If a possible automatic data transfer selection has occurred, the ACS extracts the initiator ID and sends it to both search engines (step 512). The search engines, proceeding in parallel, determine whether the initiator ID obtained from the bus corresponds to an initiator supported by one of the cache entries (steps 520, 530). If the ID is found in one of the cache entries (steps 521, 531) and the cache entry is not already locked, the cache entry is locked and the appropriated status bit altered accordingly. The appropriate cache entry is selected through the multiplexer (steps 522, 532) and the initiator parameters passed to the ACS (steps 523, 533). The controller may then automatically begin the data transfer requested by the selection command (steps 524, 534).

Referring back to steps 520 and 530, if the initiator ID is not found in either cache entry, the controller interrupts the microprocessor (step 540) and disables automatic data transfer after optionally pausing or disconnecting. However the initiator parameters preloaded in the cache entries should support all initiators and allow the controller to automatically transition from selection to data transfer. In a system with few initiators or with several initiators having the same parameters, this solution can offer complete support at low cost.

As a further refinement, the automatic data transition may be furnished with the ability to generate an interrupt to the microprocessor as the controller transitions from the command phase to the data phase. This allows the microprocessor to begin a disk seek at the earliest possible point in time and to perform all required queue and cache management.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method of responding to an initiator in a data processing system including a plurality of initiators and at least one target, comprising:

storing a plurality of cache entries, wherein each cache entry includes a set of initiator parameters and a list of a plurality of initiators which are supported by the set of initiator parameters;

receiving into a protocol engine an initiator ID from the initiator;

loading the initiator ID and the list of initiators of each cache entry into a respective search engine;

using each search engine to determine whether the initiator ID corresponds to the list of initiators loaded in the respective search engine;

if it is determined that the initiator ID corresponds to the list of initiators of any of the cache entries, loading into the protocol engine the set of initiator parameters of the cache entry which has been determined to correspond to the initiator ID; and responding to the initiator using the set of initiator parameters which have been loaded into the protocol engine.

2. The method of claim 1, further comprising:

automatically beginning a data transfer requested by the initiator, wherein the initiator corresponds to the list of initiators which are supported by the set of initiator parameters of at least one of said cache entries.

3. The method of claim 1, further comprising:

if it is determined that the initiator ID does not correspond to the list of initiators of any of the cache entries, sending a signal to a microprocessor to initiate a determination of whether one of said cache entries should be updated.

4. The method of claim 1, further comprising locking the cache entry which has been determined to correspond to the initiator ID.

5. The method of claim 1, further comprising updating the respective cache entry and locking the cache entry while it is being updated.

6. A controller, comprising:

a protocol engine connected to a bus and receiving initiator requests;

a cache entry including:
      initiator information for initiators of a first type, and
      a field identifying initiators supported by the initiator information; and a search engine receiving an initiator identifier and comparing the initiator identifier to the cache entry field, wherein the controller selects the cache entry if a match between the initiator identifier and the cache entry field is determined, wherein the cache entry comprises a first cache entry within a plurality of cache entries, each cache entry containing initiator information for initiators of a corresponding type and a field identifying initiators supported by the initiator information, wherein the search engine is a first search engine and wherein the controller further comprises:

a second search engine receiving the initiator identifier and comparing the initiator identifier to a cache entry field in a second cache entry within the plurality of cache entries, to determine whether a match between the initiator identifier and the cache entry field in the second entry is present.

7. The controller of claim 6, wherein the controller automatically begins a transaction requested by an initiator.

8. The controller of claim 6, further comprising:

a multiplexer selecting a cache entry within the plurality of cache entries responsive to a match between an initiator identifier and a cache entry field within the selected cache entry being determined.

9. The controller of claim 6, wherein the cache entry field contains data corresponding to a plurality of intiator identifiers.

10. The controller of claim 9, wherein the controller automatically begins a transaction requested by an initiator having an identifier within the plurality of initiator identifiers.

11. A method of responding to an initiator request, comprising:

storing a plurality of cache entries, wherein each cache entry includes a set of initiator parameters and a list of a plurality of initiators which are supported by the set of initiator parameters;

receiving an identifier for a requesting initiator;

loading the identifier for the requesting initiator and the list of initiators of each cache entry into a respective search engine;

using each search engine to compare the identifier for the requesting initiator to the respective list of initiators;

responsive to determining a match between the requesting initiator identifier and the list of initiators of any of the cache entries, selecting the cache entry containing the respective list of initiators; and responding to the initiator request employing initiator parameters contained within the selected cache entry, wherein a transaction requested by an initiator may be automatically commenced.

12. The method of claim 11, wherein the step of comparing the identifier for the requesting initiator to the respective list of initiators further comprises:

comparing the identifier for the requesting initiator to a plurality of cache entry fields, each cache entry field within the plurality of cache entry fields containing data corresponding to a plurality of initiator identifiers.

13. The method of claim 12, wherein the step of comparing the identifier for the requesting initiator to a list of initiators further comprises:

simultaneously comparing the identifier for the requesting initiator to a cache entry field for a plurality of cache entries, each cache entry within the plurality of cache entries containing initiator information corresponding to a different group of initiators, wherein the cache entry field includes data corresponding to initiator identifiers for a group of initiators.

14. The method of claim 12, wherein the step of selecting a cache entry further comprises:

selecting a cache entry within a plurality of cache entries, each cache entry within the plurality of cache entries containing initiator information corresponding to a different group of initiators identified by the plurality of intiator identifiers.

15. The method of claim 12, wherein the step of selecting a cache entry further comprises:

selecting a cache entry within a plurality of cache entries, wherein the selected cache entry includes a cache entry field containing data corresponding to the identifier for the requesting initiator.

16. The method of claim 14, further comprising:

employing initiator information contained within the selected cache entry to the initiator request.

17. The method of claim 11, further comprising:

locking the selected cache entry.

* * * * *